(12) United States Patent
Bilra et al.

(10) Patent No.: US 12,724,928 B2
(45) Date of Patent: Sep. 1, 2026

(54) METHOD AND DEVICE FOR CHECKING AN INTEGRITY OF DATA STORED IN A NON-VOLATILE MEMORY OF AN ELECTRONIC CONTROL UNIT OF A VEHICLE

(71) Applicant: Bayerische Motoren Werke Aktiengesellschaft, Munich (DE)

(72) Inventors: Manjeet Singh Bilra, Hoerlkofen (DE); Mohamed-Saad Abdelhameed, Dachau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 87 days.

(21) Appl. No.: 18/709,866

(22) PCT Filed: Nov. 9, 2022

(86) PCT No.: PCT/EP2022/081325
§ 371 (c)(1),
(2) Date: May 14, 2024

(87) PCT Pub. No.: WO2023/110232
PCT Pub. Date: Jun. 22, 2023

(65) Prior Publication Data

US 2025/0021700 A1 Jan. 16, 2025

(30) Foreign Application Priority Data

Dec. 14, 2021 (EP) .................................... 21214218

(51) Int. Cl.
*G06F 21/64* (2013.01)
*H04L 9/32* (2006.01)

(52) U.S. Cl.
CPC ............ *G06F 21/64* (2013.01); *H04L 9/3242* (2013.01)

(58) Field of Classification Search
CPC ........ G06F 21/64; G06F 21/57; G06F 21/572; G06F 21/575; G06F 21/645; H04L 9/3242; H04L 9/3236; H04L 9/3239
See application file for complete search history.

(56) References Cited

U.S. PATENT DOCUMENTS

2014/0032916 A1 1/2014 Costin et al.
2016/0344705 A1 11/2016 Stumpf et al.
(Continued)

OTHER PUBLICATIONS

International Search Report (PCT/ISA/210) issued in PCT Application No. PCT/EP2022/081325 dated Feb. 16, 2023 (4 pages).
(Continued)

*Primary Examiner* — Malcolm Cribbs
(74) *Attorney, Agent, or Firm* — Crowell & Moring LLP

(57) ABSTRACT

Systems, methods, and apparatuses are provided for checking an integrity of data stored in an electronic control unit of a vehicle. A first hash value is determined based on the stored data using a hash function at the electronic control unit triggered by a request of a boot loader of the electronic control unit. A second hash value is determined based on the stored data using the hash function at the electronic control unit triggered by a request of an external computing device connected to the electronic control unit. The integrity of the stored data is checked by comparing the determined first hash value to the determined second hash value.

15 Claims, 2 Drawing Sheets

(56) References Cited

U.S. PATENT DOCUMENTS

| | | | | |
|---|---|---|---|---|
| 2017/0302441 | A1 | 10/2017 | Temple et al. | |
| 2019/0332773 | A1* | 10/2019 | Konetski | H04L 63/126 |
| 2020/0169459 | A1* | 5/2020 | Colombo | G06F 21/572 |

OTHER PUBLICATIONS

Written Opinion (PCT/ISA/237) issued in PCT Application No. PCT/EP2022/081325 dated Feb. 16, 2023 (6 pages).
Extended European Search Report issued in European Application No. 21214218.6 dated May 12, 2022 (7 pages).

* cited by examiner

METHOD AND DEVICE FOR CHECKING AN INTEGRITY OF DATA STORED IN A NON-VOLATILE MEMORY OF AN ELECTRONIC CONTROL UNIT OF A VEHICLE

BACKGROUND AND SUMMARY

The present subject matter is directed to a method for checking an integrity of data stored in an electronic control unit of an vehicle, a data processing system configured to carry out the method at least partly, a computer program comprising instructions which, when the program is executed by a computer, cause the computer to carry out the method at least partly, a computer-readable medium comprising instructions which, when the program is executed by a computer, cause the computer to carry out the method at least partly, and a vehicle (optionally a car or automobile) comprising the data processing system as least partly.

The background of the application is to create inter alia a safe and secure boot loading and/or flashing process of an electronic control unit (ECU) of an automated vehicle to ensure a certain ASIL integrity, e.g., ASIL B integrity, for the ECU used in automated driving.

More specifically, in automated driving, especially highly automated and autonomous driving, hardware and software components of the automated vehicle used for the automated driving, e.g., by directly and/or indirectly controlling a movement of the automated vehicle, need to provide a certain Automotive Safety Integrity Level (ASIL).

ISO 26262, part 9 specifies the Automotive Safety Integrity Level (ASIL) which refers to an abstract classification of inherent safety risk in an automotive system or elements of such a system. ASIL classifications are used within ISO 26262 to express the level of risk reduction required to prevent a specific hazard, with ASIL D representing the highest hazard level and ASIL A the lowest. The ASIL assessed for a given hazard is then assigned to the safety goal set to address that hazard and is then inherited by the safety requirements derived from that goal. The ASIL level below A is the lowest level, QM. QM refers to the standard's consideration that below ASIL A; there is no safety relevance and only standard Quality Management processes are required.

Currently, the Process of boot loading from a non-volatile memory (NVM) of an ECU to a read only memory (ROM) or flash memory (e.g., EEPROM-Flash) and to a random access memory (RAM) and a processing unit (e.g., a central processing unit, CPU) (i.e., "application") of an ECU, respectively, does not have any safety integrity but is classified as QM.

Due to this inheritance disadvantage, it may result into corruption of the data stored or transferred from NVM to ROM/Flash and from RAM to the processing unit.

Against the background of this prior art, one object of the present subject matter is, inter alia, to provide a device and a method which are suitable for overcoming at least some of the above-mentioned disadvantages of the prior art, respectively.

More specifically, the object is solved by a method for checking an integrity of data stored in an electronic control unit of a vehicle.

Data integrity may be defined as the maintenance of, and the assurance of, data accuracy and consistency over its entire life-cycle. Data integrity is the opposite of data corruption. The overall intent of any data integrity technique is the same: ensure data is recorded exactly as intended. Moreover, upon later retrieval, ensure the data is the same as when it was originally recorded/stored. In short, data integrity aims to prevent unintentional changes to information. Any unintended changes to data as the result of a storage, retrieval or processing operation, including malicious intent, unexpected hardware failure, and human error, is failure of data integrity. If the changes are the result of unauthorized access, it may also be a failure of data security.

The method comprises determining a first hash value based on the stored data using a hash function at the electronic control unit triggered by a request of a boot loader of the electronic control unit.

A boot loader, also spelled as bootloader or called boot manager and bootstrap loader, is a computer program that is responsible for booting a computer, here the electronic control unit. When the electronic control unit is turned off (e.g., the vehicle is turned off) and after flashing thereof, its data (including software such as an operating system and an application code, and information) is stored on a non-volatile memory (NVM) of the electronic control unit. When the electronic control unit is powered on (e.g., after flashing thereof or after being turned off), it typically does not have an operating system or its loader in a random-access memory (RAM) of the electronic control unit. Therefore, the electronic control unit first executes a relatively small program, the boot loader, stored in a read-only memory (ROM)/flash memory along with some needed data, to initialize the RAM, to access the NVM (also called nonvolatile device, e.g., a NAND flash) or devices from which the operating system programs and data can be loaded into the RAM.

Flashing may involve inter alia overwriting of existing data such as firmware, software or information, optionally contained in the ROM or flash memory module present in the electronic control unit, with new data. This can be done to upgrade the electronic control unit or during production of the vehicle.

The term "data" as used herein may include but is not limited to an application software being executable by the electronic control unit, parameters and other information used by the application software and/or an operating system of the electronic control unit.

The method comprises determining a second hash value based on the stored data using the hash function at the electronic control unit triggered by a request of an external computing device connected to the electronic control unit.

A hash function is any function that can be used to map data of arbitrary size to fixed-size values. The values returned by a hash function are called hash values, hash codes, digests, or simply hashes.

The hash function used by the method is preferably a cryptographic hash function (CHF) which is a mathematical algorithm that maps data of an arbitrary size (often called the "message") to a bit array of a fixed size (the "hash value", "hash", or "message digest"). It is a one-way function, that is, a function for which it is practically infeasible to invert or reverse the computation. Ideally, the only way to find a message that produces a given hash is to attempt a brute-force search of possible inputs to see if they produce a match, or use a rainbow table of matched hashes. Moreover, a cryptographic hash function is deterministic, meaning that the same message always results in the same hash.

The method comprises checking the integrity of the stored data by comparing the determined first hash value to the determined second hash value.

That is, since the two hashes determined upon request of the boot loader and the external computing device, e.g., a flashing tool for the electronic control unit, are determined using the same (cryptographic) hash function which takes as input the data stored at the electronic control unit are the same when no data corruption happened in between determining the first and the second hash value.

In the following preferred embodiments of the method are described in detail.

The first and/or the second hash value may be determined by a hardware security module of the electronic control unit.

A hardware security module (HSM) is a physical computing device that may be configured to safeguard and manage digital keys, perform encryption and/or decryption functions for digital signatures, and carries out a hash algorithm for the (cryptographic) hash function used by the method. The hardware security module may contain one or more secure cryptoprocessor chips. The hardware security module may be implemented as a system on a chip (SoC) which is an integrated circuit (also known as a "chip") that integrates all or most components of the hardware security module. These components may include a central processing unit (CPU), a memory, input/output ports and a secondary storage, all on a single substrate or microchip. It may contain digital, analog and/or mixed-signal processing functions.

The determined first hash value may be output by the bootloader of the electronic control unit to the external computing device. That is, the electronic control unit may comprise an output interface/port being (directly or indirectly) accessible by the boot loader for sending the first hash value to the external computing device.

The determined second hash value may be output by the hardware security module of the electronic control unit to the external computing device. That is, the electronic control unit or the hardware security module itself may comprise an output interface/port being (directly or indirectly) accessible by the hardware security module for sending the second hash value to the external computing device.

The external computing device may check the integrity of the stored data by comparing the determined first hash value to the determined second hash value. That is, the data integrity check may be performed by the external computing device.

The method may comprise storing the data in a memory of the electronic control unit using the external computing device. More specifically, the method may comprise flashing the electronic control unit thereby storing the data which integrity should be checked by the method at the electronic control unit. The data may be stored in the memory (system) of the electronic control unit which may comprise a non-volatile memory, a random-access memory, and/or a read-only memory or a flash memory.

The method may comprise determining a third hash value based on the data to be stored in the memory of the electronic control unit using the hash function at the external computing device prior to storing the data in the memory of the electronic control unit.

The third hash value may be determined by a hardware security module of the external computing device.

The method may comprises checking the integrity of the stored data by comparing the determined first hash value to the determined third hash value.

More specifically, the external computing device may checks the integrity of the stored data by comparing the determined first hash value to the determined third hash value.

That is, since the first hash determined upon request of the boot loader and the third hash determined at the external computing device before flashing the electronic control unit are determined using the same (cryptographic) hash function (which takes as input the data stored at the electronic control unit and the data to be stored/flashed at the electronic control unit), this checks allows to ensure data integrity of the flashed data, i.e., that no data corruption happened during flashing the electronic control unit.

The method may comprise storing the determined first hash value at the electronic control unit, optionally by the boot loader and/or the hardware security module of the electronic control unit. The method may further comprise determining a fourth hash value based on the stored data using the hash function at the electronic control unit triggered by a request of an application running on the electronic control unit and checking the integrity of the stored data by comparing the determined first hash value to the determined fourth hash value.

The application, optionally taking sensor data from a sensor connected to the electronic control unit as input, may check the integrity of the stored data by comparing the determined first hash value to the determined third hash value.

Determining the fourth hash value and the checking the integrity of the stored data by comparing the determined first hash value to the determined third hash value is done once at a start of the application and/or cyclically during a runtime of the application.

That is, since the first hash determined upon request of the boot loader and the fourth hash determined during runtime of the application are determined using the same (cryptographic) hash function (which takes as input the data stored at the electronic control unit), this check allows to ensure data integrity of the data used by the application, i.e., that no data corruption happened after flashing and booting the electronic control unit.

An error correction code (ECC) and/or error detection code (EDC) memory system may be used in the electronic control unit for storing the data.

An ECC and EDC memory includes additional memory bits and a controller for encryption to work and control memory leaks. An ECC/EDC memory uses the extra bits to store an encrypted code/data when writing data to the ECC/EDC memory, and the ECC/EDC is stored at the same time. When data is read from the ECC/EDC memory a further ECC/EDC is generated based on the read data, and then the stored ECC/EDC is compared to the ECC/EDC that was generated when the data was read. If the ECC/EDC that was generated during reading the data doesn't match the stored ECC/EDC, the data is corrupted and optionally in case of ECC might be fixed/decrypted by so-called parity bits stored with the data in the ECC memory to determine which bit was corrupted and then this corrupted bit may be (optionally immediately) corrected. That is, using EDC the error is detected and using ECC the error is detected and might by corrected in certain cases such as a single bit flip. If the error cannot be corrected, the error is communicated (e.g., in case of multiple bit failures). More specifically, the stored data may be read from the ROM/flash using the boot loader and from the RAM to the application (software). These reading and storing operations may be protected using ECC/EDC. In case of any data leakage or data bit flip, the ECC/EDC created during writing to the respective memory and the ECC/EDC created during reading from the respective memory mismatches and this results into an error detection (EDC) or even error correction (ECC). This ensure data integrity during normal operation of the electronic control unit, i.e., during and after booting thereof.

Symmetric and/or asymmetric encryption using private and/or public keys may be used for data transmission in the electronic control unit and/or between the electronic control unit and the external computing device.

Symmetric encryption or symmetric-key algorithm is a method using an algorithm for cryptography that uses the same cryptographic key for both the encryption of plaintext and the decryption of ciphertext. The keys may be identical, or there may be a simple transformation to go between the two keys. The keys, in practice, represent a shared secret between two or more parties that can be used to maintain a private information link. Asymmetric encryption, public-key cryptography, or asymmetric cryptography, is a cryptographic method that uses pairs of keys. Each pair consists of a public key (which may be known to others) and a private key (which may not be known by anyone except the owner). The generation of such key pairs depends on cryptographic algorithms which are based on mathematical problems termed one-way functions. Effective security requires keeping the private key private; the public key can be openly distributed without compromising security. A combination of these two methods is possible allows for digitally signing the communicated data. That is, at the sender a public key is used for encryption of the data and a private key is used together with a hash function to generate the signature (i.e., the hash). At the receiver, a private key is used for decryption of the received data and the public key as well as the same hash function is used for checking the signature. Thereby not only data security may be ensured (no third party corrupts data) but also data integrity since the receiver may check if the data come from the correct/expected sender.

The method may be divided in two parts, wherein a first one is an integrity check carried out after flashing the electronic control unit, e.g., during production of the vehicle, and a second one is an integrity check carried out during normal operation of the vehicle.

More specifically, the first part may be carried out during production of the vehicle, after all electronic control units as hardware are fixed to the vehicle. Each electronic control unit may receive its required software via a flashing process. In the flashing process, a flashing tool is used to flash the respective software with given version and patch to the hardware of the electronic control unit. The required software may be downloaded from the flashing tool in a first step. In a second step, the flashing tool may perform check a hash and signature check for a secure bootloader as soon as bootloading is completed. The checks may not have any safety integrity but may ensure no corruption of data happened according to QM checks.

In the second part of the method, checks are done on the electronic control unit level including a secure/trusted boot loading. The electronic control unit may have a special hardware module, i.e., a hardware security module (HSM), to carry out a hash definition/calculation. There may be two different type of checks on the electronic control unit level. A first type of check may be carried out during every start-up of the electronic control unit, i.e., every time the vehicle starts and the electronic control unit wakes up from sleep mode. During this startup test, the electronic control unit may check a hash file during secure/trusted boot loading process to ensure that no data mismatch happened using private and public keys. The second type of check may be cyclic in nature and triggered by an application (software) carried out by the electronic control unit. In addition to that a functional safety mechanism, such as an ECC (Error Correction Code) and/or EDC (error detection code), may be used to monitor and correct data corruption during boot loading from a ROM/Flash and a RAM of the electronic control unit. With Combination of both measures, i.e., the security measures in terms of hash files as QM checks and ECC/EDC checks for data corruption, an ASIL B integrity can be ensured.

Moreover, a data processing system comprising means for carrying out the above described method at least partly may be provided.

The data processing system can be or can comprise a control unit, optionally an electronic control unit (ECU), for a vehicle. The (electronic) control unit can be an intelligent processor-controlled unit that can communicate with other modules, optionally via a central gateway (CGW). The control unit can form part of the vehicle's onboard network via fieldbuses such as the CAN bus, LIN bus, MOST bus and/or FlexRay or via automotive Ethernet, optionally together with a telematics control unit. The electronic control unit may be configured to control functions relevant to a driving behavior of the vehicle, such as an engine control system, a power transmission, a braking system and/or a tire pressure control system. In addition, some or all driver assistance systems such as parking assistant, adaptive cruise control, lane departure warning, lane change assistant, traffic sign recognition, light signal recognition, approach assistant, night vision assistant, intersection assistant, and/or many others may be controlled by the control unit.

Moreover, the description given above with respect to the method applies mutatis mutandis to the data processing system and vice versa.

Furthermore, an automated vehicle comprising the above-described data processing system may be provided.

The automated vehicle may be an automobile. The automated vehicle can be designed to take over lateral and/or longitudinal guidance at least partially and/or temporarily during automated driving of the automated vehicle.

The automated driving may be such that the driving of the vehicle is (largely) autonomous.

The vehicle may be a vehicle of autonomy level 1, i.e., have certain driver assistance systems that support the driver in vehicle operation, for example adaptive cruise control (ACC).

The vehicle can be a vehicle of autonomy level 2, i.e., be partially automated in such a way that functions such as automatic parking, lane keeping or lateral guidance, general longitudinal guidance, acceleration and/or braking are performed by driver assistance systems.

The vehicle may be an autonomy level 3 vehicle, i.e., automated in such a conditional manner that the driver does not need to continuously monitor the system vehicle. The motor vehicle autonomously performs functions such as triggering the turn signal, changing lanes, and/or lane keeping. The driver can attend to other matters but is prompted by the system to take over control within a warning time if needed.

The vehicle may be an autonomy level 4 motor vehicle, i.e., so highly automated that the driving of the vehicle is permanently taken over by the system vehicle. If the driving tasks are no longer handled by the system, the driver may be requested to take over control.

The vehicle may be an autonomy level 5 vehicle, i.e., so fully automated that the driver is not required to complete the driving task. No human intervention is required other than setting the destination and starting the system. The vehicle can operate without a steering wheel or pedals.

Moreover, the description given above with respect to the method and the data processing system applies mutatis mutandis to the vehicle and vice versa.

Furthermore, a computer program may be provided, the computer program comprising instructions which, when the program is executed by a computer, cause the computer to carry out the above-described method at least partly.

The program may comprise any program code, in particular a code suitable for control systems of vehicles. The description given above with respect to the method, the data processing system and the vehicle applies mutatis mutandis to the computer program and vice versa.

Furthermore, computer-readable medium may be provided, the computer-readable medium comprising instructions which, when executed by a computer, cause the computer to carry out the above-described method at least partly.

The computer-readable medium may be any digital data storage device, such as a USB flash drive, a hard disk, a CD-ROM, an SD card, or an SSD card. The above-described computer program may be stored on the computer-readable medium. However, the computer program does not necessarily have to be stored on such a computer-readable medium but can also be obtained via the Internet.

DETAILED DESCRIPTION OF THE DRAWINGS

In the following an embodiment is described with reference to FIGS. 1 and 2, wherein the same reference signs are used for the same objects throughout the description of the figures and wherein the embodiment is just one specific example for implementing the present subject matter and does not limit the scope of the present subject matter as defined by the claims.

Figure 1:
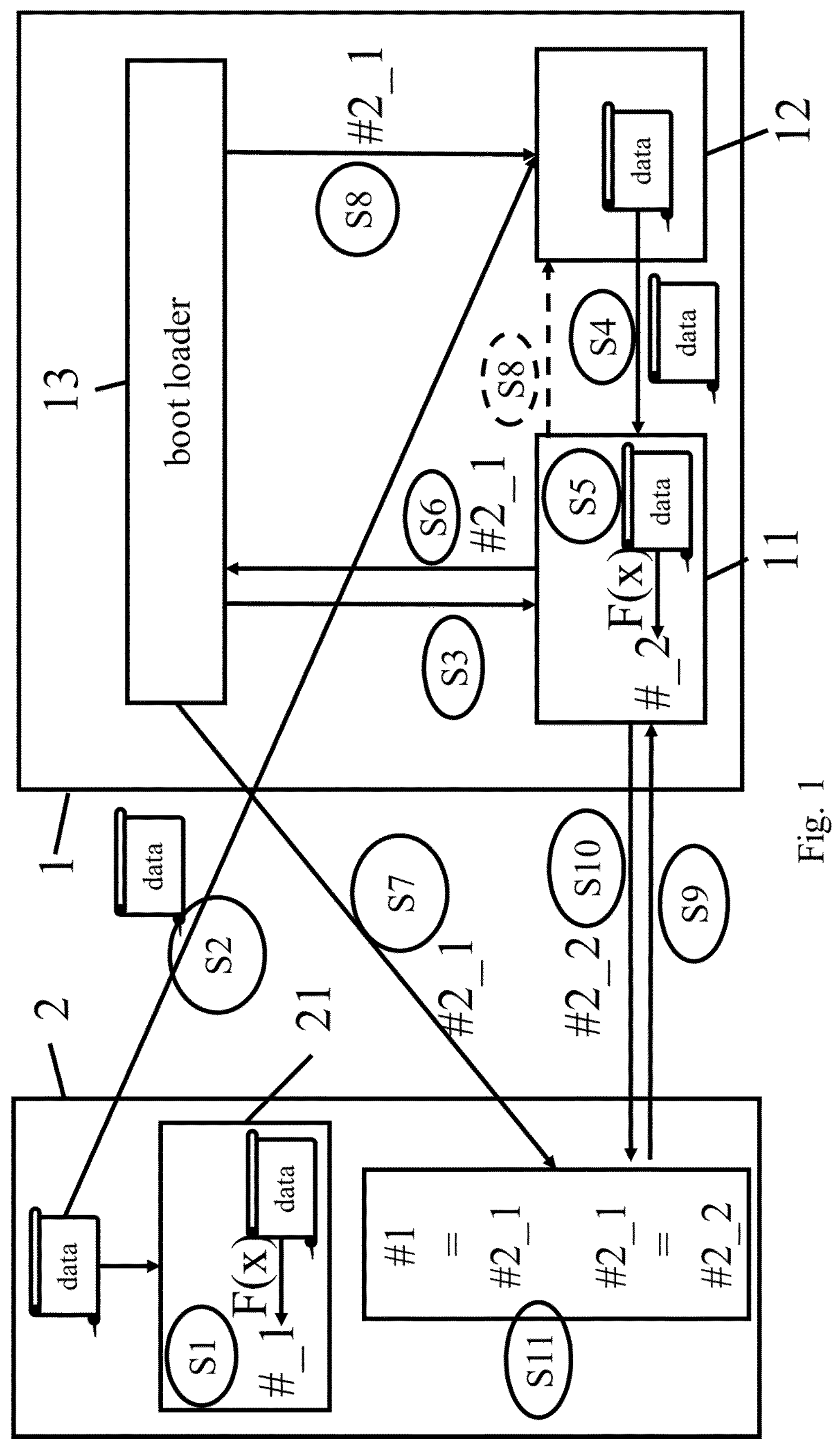
FIG. 1 depicts schematically a system comprising a flashing tool connected to an electronic control unit for checking an integrity of data stored in the electronic control unit after flashing the electronic control unit.

In FIG. 1 a data processing system comprising an electronic control unit 1 and a flashing tool 2 being wirelessly or via wire connected to the electronic control unit 1, e.g., via a vehicle bus, is shown. The electronic control unit 1 may be part of a not shown vehicle. In FIG. 2 the same electronic control unit 1 is shown. FIG. 1 depicts a first state of the data processing system in a production side of the vehicle and FIG. 2 depicts a second state of the data processing system after production of the vehicle, i.e., during normal operation of the vehicle.

The data processing system is configured to carry out a method for checking an integrity of data stored in the electronic control unit. Both, the electronic control unit 1 and the flashing tool 2, comprise a hardware security module 11, 21. Moreover, the electronic control unit 1 comprises a processor 13 for carrying out one or more applications (software) and triggering a bootloader during start-up of the electronic control unit, as well as a memory system 12 with a non-volatile memory, a read only memory or a flash memory and a random access memory.

Figure 2:
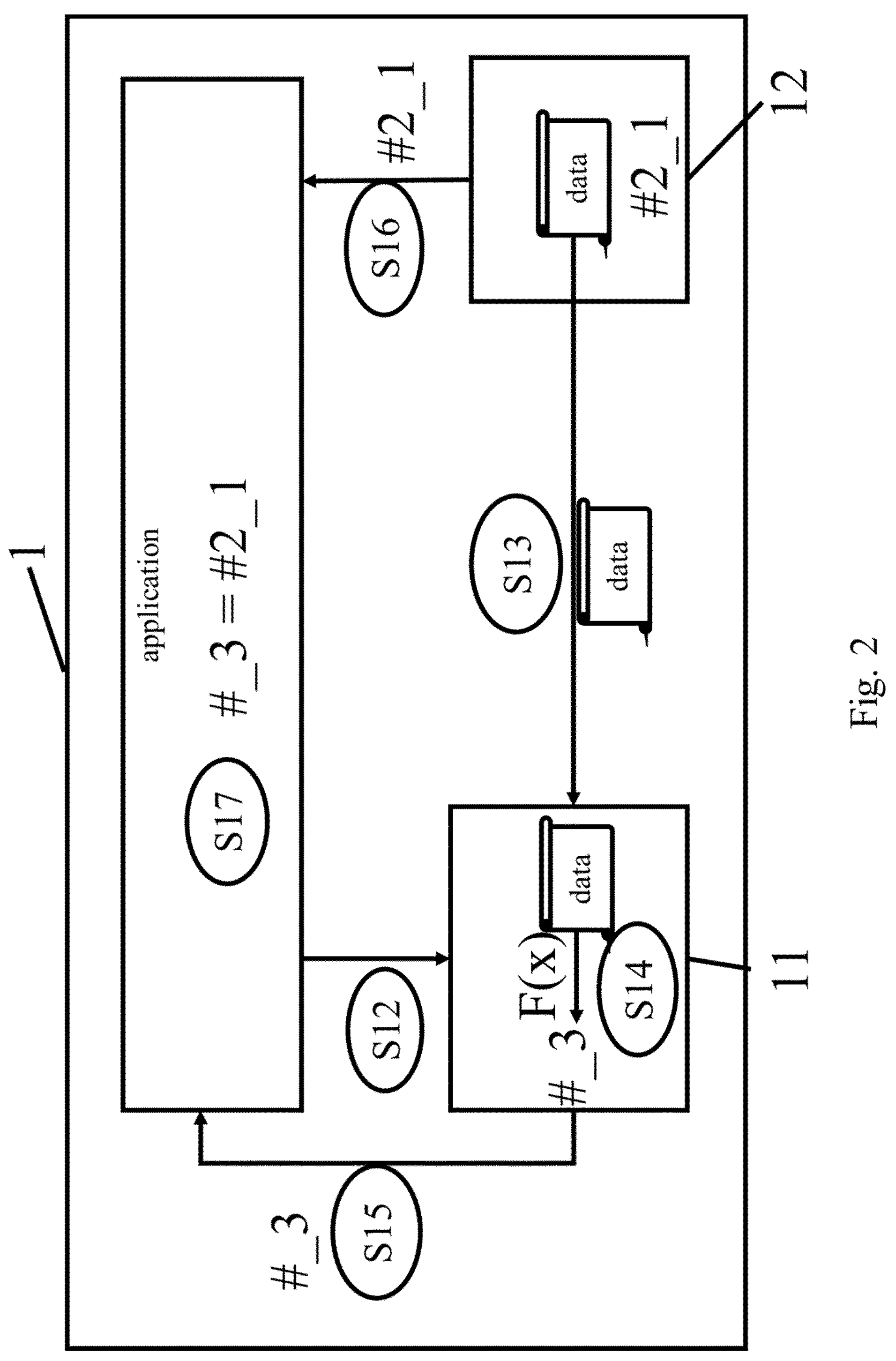
FIG. 2 depicts schematically the electronic control unit carrying out/running an application for checking an integrity of data stored in the electronic control unit.

As can be gathered from FIGS. 1 and 2, the method for checking the data integrity of the data stored at the electronic control module 1 comprises substantially seventeen steps S1-S17. These steps may be performed in the shown order or in any other order being suitable for carrying out the method.

In a first step S1 of the method determining a hash value #1 is determined based on data to be stored in the memory 12 of the electronic control unit 1 using a hash function F(x) at the flashing tool 2. For generating the hash value #1 the data is at least partly input into the hardware security module 21 of the external computing device 2 which computes the hash value #1 using the hash function F(x). Here, the data are the input for the hash function F(x).

After generating the hash value #1 in the first step S1 of the method and thus in a second step S2 of the method, the flashing tool 2 sends the data to the memory 12 of the electronic control unit 1 thereby storing the data in the memory 12 of the electronic control unit 1. The flashing itself is done after the second step S2.

In a third step S3 of the method, the electronic control unit 1 is powered on and the bootloader is started. The bootloader sends a request for a hash value to the hardware security module 11 of the electronic control unit.

In a fourth step S4 of the method, the hardware security module 11 of the electronic control unit 1, which was triggered by the request of the bootloader in the third step S3, loads the data received in the second step S2 and stored in the memory 12 of the electronic control unit 1 into the hardware security module 11 of the electronic control unit 1 at least partly.

The data loaded into the hardware security module 11 of the electronic control unit 1 is used in a fifth step S5 by the hardware security module 11 of the electronic control unit 1 to determine using the hash function F(x) a hash value #2_1.

In sixth step S6 of the method, the hash value #2_1 determined in the fifth step S5 is output from the hardware security module 11 of the electronic control unit 1 to the boot loader, and in a seventh step S7 of the method, this hash value #2_1 is provided by the bootloader of the electronic control unit 1 to the flashing tool 2.

Moreover, in an eighth step S8 of the method, this hash #2_1 is stored in the memory 12 of the electronic control unit 1 using the boot loader or may be stored in the memory 11 directly using the hardware security module 11 of the electronic control unit 1 (second option shown with dotted lines in FIG. 1).

In a ninth step S9 of the method, the flashing tool 2 sends a request to the hardware security module 11 of the electronic control unit 1 for carrying out the fifth step S5 of the method again, i.e., for determining a further hash value #2_2 based on the data stored in the memory 12 of the electronic control unit 1 using the same hash function F(x). Thus, the further hash #2_2 is determined initiated by the request in the ninth step S9 issued by the flashing tool 2 using the hardware security module 11 of the electronic control unit 1.

This further hash value #2_2 is output in a tenth step S10 by the hardware security module 11 of the electronic control unit 1 to the flashing tool 2.

In an eleventh step S11 two data integrity checks are performed at the flashing tool 2. In a first check, the flashing tool 2 checks the integrity of the stored data by comparing the hash value #2_1 determined in the fifth step S5 triggered by the boot loader with the determined further hash value #2_2 requested in the ninth step S9 by the flashing tool 2. In a second check, the flashing tool 2 checks the integrity of the stored data by comparing the hash value #2_1 determined in the fifth step S5 triggered by the boot loader with the hash value #2_1 determined in the first step S1 of the method. If both checks are positive, i.e., if all three hash values #1, #2_1, #2_2 are the same, data integrity is given. Otherwise the flashing tool 2 raises an error flag due to data corruption. The flashing check is done after finishing the eleventh step S11 of the method.

During normal operation of the vehicle, a filed check is carried out which will be explained in detail in the following.

In a twelfth step S12 of the method, an application running on the electronic control unit 1 sends a request to the hardware security module 11 of the electronic control unit for determining in a fourteenth step S14 a hash value #3 based on the data stored in the memory 12 and loaded into the hardware security module 11 of the electronic control unit 1 during a thirteenth step S13 of the method. That is, analogously to the third to fifth step S3-S5 described above and initiated/triggered by the request of the application, the hardware security module 11 of the electronic control unit 1 determines using the same hash function F(x) the hash value #3.

The hash value #3 determined in the fourteenth step S14 of the method is output to the application by the hardware security module 11 of the electronic control unit 1.

In a sixteenth step S16 of the method, the application loads the hash value #2_1 which was stored in the eight step S8 of the method from the memory 12.

In an seventh step S17 of the method, the application checks the integrity of the stored data by comparing the hash value #3 determined in the fourteenth step S14 with the hash value stored in the memory 11 in the eighth step S8 of method. If this check is positive, i.e., the two hash value #2_1, #3 are the same, data integrity is given. Otherwise the application raises an error flag due to data corruption.

The twelfth to seventh step S12-S17 may be carried out once at a start of the application and/or cyclically during a runtime of the application.

The memory 11 used in the above method is an error correction code memory system such that a reliability of the method is further enhanced. Additionally, symmetric and/or asymmetric encryption using private and/or public keys is/are used for data transmission in the electronic control unit and/or between the electronic control unit 1 and the external computing device 2.

The invention claimed is:

1. A method for checking an integrity of data stored in an electronic control unit of a vehicle, the method comprising:
determining a first hash value of the stored data using a hash function at the electronic control unit triggered by a request received from a boot loader of the electronic control unit;
determining a second hash value of the stored data using the hash function at the electronic control unit triggered by a request received from an external computing device connected to the electronic control unit; and
checking the integrity of the stored data by comparing the determined first hash value to the determined second hash value.

2. The method according to claim 1, wherein the first and/or the second hash value is/are determined by a hardware security module of the electronic control unit.

3. The method according to claim 1, wherein the determined first hash value is output by a bootloader of the electronic control unit to the external computing device.

4. The method according to claim 3, wherein
the first and/or the second hash value is/are determined by a hardware security module of the electronic control unit; and
the determined second hash value is output by the hardware security module of the electronic control unit to the external computing device.

5. The method according to claim 1, further comprising:
checking, by the external computing device, the integrity of the stored data by comparing the determined first hash value to the determined second hash value.

6. The method according to claim 1, further comprising:
storing the data in a memory of the electronic control unit using the external computing device; and
prior to storing the data in the memory of the electronic control unit, determining a third hash value based on the data to be stored in the memory of the electronic control unit using the hash function at the external computing device.

7. The method according to claim 6, wherein the third hash value is determined by a hardware security module of the external computing device.

8. The method according to claim 6, further comprising:
checking the integrity of the stored data by comparing the determined first hash value to the determined third hash value.

9. The method according to claim 8, further comprising:
checking, by the external computing device, the integrity of the stored data by comparing the determined first hash value to the determined third hash value.

10. The method according to claim 1, further comprising:
storing the determined first hash value at the electronic control unit;
determining a fourth hash value based on the stored data using the hash function at the electronic control unit triggered by a request of an application running on the electronic control unit; and
checking the integrity of the stored data by comparing the determined first hash value to the determined fourth hash value.

11. The method according to claim 10, further comprising:
checking, by the application, the integrity of the stored data by comparing the determined first hash value to the determined fourth hash value.

12. The method according to claim 10, wherein the determining the fourth hash value and the checking the integrity of the stored data by comparing the determined first hash value to the determined third hash value is done once at a start of the application and/or cyclically during a runtime of the application.

13. The method according to claim 1, wherein an error correction code memory is used in the electronic control unit for storing the data.

14. The method according to claim 1, wherein symmetric and/or asymmetric encryption using private and/or public keys is/are used for data transmission in the electronic control unit and/or between the electronic control unit and the external computing device.

15. A data processing system, comprising:
a processor; and
a memory in communication with the processor and storing instructions executable by the processor to configure the data processing system to:
determine a first hash value of stored data via a hash function at an electronic control unit triggered by a request received from a boot loader of the electronic control unit,
determine a second hash value of the stored data via the hash function at the electronic control unit triggered by a request received from an external computing device connected to the electronic control unit, and check the integrity of the stored data by a comparison of the determined first hash value to the determined second hash value.

* * * * *